(12) United States Patent
Liu

(10) Patent No.: US 7,693,209 B2
(45) Date of Patent: Apr. 6, 2010

(54) METHOD FOR CARRIER FREQUENCY OFFSET FINE ESTIMATION IN TD-SCDMA SYSTEM

(75) Inventor: Jiwu Liu, Shanghai (CN)

(73) Assignee: Spreadtrum Communications Inc., Grand Cayman (KY)

( * ) Notice: Subject to any disclaimer, the term of this patent is extended or adjusted under 35 U.S.C. 154(b) by 843 days.

(21) Appl. No.: 11/297,982

(22) Filed: Dec. 9, 2005

(65) Prior Publication Data
US 2006/0140257 A1   Jun. 29, 2006

(30) Foreign Application Priority Data
Dec. 24, 2004   (CN) .................. 2004 1 0093554

(51) Int. Cl.
H04B 1/69   (2006.01)
H04L 27/06   (2006.01)

(52) U.S. Cl. .................. 375/147; 375/149; 375/344

(58) Field of Classification Search .................. 375/130, 375/140, 145, 147, 149, 316, 340, 35, 362–367, 375/344, 354; 370/335, 342, 503, 509–515, 370/441
See application file for complete search history.

(56) References Cited

U.S. PATENT DOCUMENTS

| 7,027,495 | B2 * | 4/2006 | Demir et al. ................. 375/150 |
| 2003/0076812 | A1 * | 4/2003 | Benedittis ................... 370/350 |
| 2005/0075125 | A1 * | 4/2005 | Bada et al. .................. 455/525 |
| 2005/0107061 | A1 * | 5/2005 | Grieco et al. ............... 455/313 |
| 2007/0104252 | A1 * | 5/2007 | Jang .......................... 375/147 |
| 2007/0133611 | A1 * | 6/2007 | Li et al. ..................... 370/503 |
| 2007/0140203 | A1 * | 6/2007 | Qiao .......................... 370/342 |

OTHER PUBLICATIONS

3GPP TS 25. 223 V. 5.1.0, "Technical Specification Group Radio Access Network Spreading and Modulation (TDD) (release 5)," 2002, pp. 1-36.*

* cited by examiner

Primary Examiner—Tesfaldet Bocure

(57) ABSTRACT

A simple and efficient method is provided for frequency offset fine estimation. The method comprises: subtracting the QPSK modulation phase of a synchronization code from its received phase to generate the phase drift, and then computing the frequency offset based on the phase drift.

2 Claims, 2 Drawing Sheets

New Sheet

Figure 1: Structure of the sub-frame in TD-SCDMA system

METHOD FOR CARRIER FREQUENCY OFFSET FINE ESTIMATION IN TD-SCDMA SYSTEM

TECHNICAL FIELD OF THE INVENTION

The present invention relates to a carrier frequency offset fine estimation method in a telecommunications system, and more specifically, for a TD-SCDMA (Time Division-Synchronous Code Division Multiple Access) system.

BACKGROUND

For operation normal of a cellular telecommunications system, a mobile handset needs to align its frequency with that of a base station by measuring the frequency offset and performing automatic frequency control (AFC) to minimize the frequency drift to the smallest possible range. Thus, in order to compensate for the offset, the frequency offset needs to be first obtained.

Coarse and fine tuning is commonly successively implemented in AFC to correct the frequency offset. Coarse frequency tuning is utilized to narrow a large frequency offset to a relatively small value, while fine tuning is to further correct this to a smallest possible value, thus improving the frequency synchronization accuracy.

Accordingly, two-stage frequency offset compensation by using short sequences for coarse estimation followed by long sequences for fine estimation is commonly employed in AFC. The coarse estimation is low in precision but is effective in estimating frequency offset of relatively large values, whereas fine estimation is efficient in the presence of the offset that is of small value, as it can achieve relatively high frequency tuning precision.

It is known that the frequency offset affects the received signal by the mobile handset by generating phase drift in the sample signal. It is also known that the size of this drift is in proportion to the frequency offset and the duration of the signal sequence. The relationship is defined by the expression $\Delta\phi=\Delta f^*T$, where $\Delta\phi$ is phase drift, $\Delta f$ represents frequency offset and T denotes sequence length. Prior art frequency offset estimation schemes typically measure the phase drift in order to derive the frequency offset. It is therefore the phase drift needs to be obtained by the means of comparing the phase of a received signal with that of a reference signal.

Accordingly, there exist several phase drift estimation methods used in TD-SCDMA system, one of which is to use the SYNC-DL (Synchronization Downlink) sequence in the downlink pilot (DwPTS). The content of DwPTS is composed of 64 chips of a SYNC-DL sequence, and 32 chips of a guard period (GP). There are 32 different basic SYNC-DL codes for the whole system.

The SYNC-DL sequence is known to a mobile handset after DwPTS channel synchronization in the cell search upon the mobile handset powering on. Thus, it can be used as a reference signal with which the receiving signal can be compared to derive the phase drift. However, because the SYNC-DL sequence is a short sequence (only of a period of 64-chips), the corresponding drift brought by the frequency offset will not be that distinct. Thus, this scheme is only suitable to make coarse frequency estimation.

A frequency offset fine estimation scheme in the industry is to derive the difference between the phase of the demodulated signal after a joint detection process and that of the signal produced by hard decision device. "Joint Detection" is a key technology in a TD-SCDMA system, which can increase the communication capacity by suppressing the interference from other users. In this method, several signal data (normally 4~8 symbols) closer to the Midamble will be used for frequency offset estimation. Specifically, data neighboring to the Midamble on the front and back which is more than 144 chips in length is used. Thus, the phase drift caused by the frequency offset may be distinct enough to estimate frequency fine offset. However, as Joint Detection requires numerous computations, this method is not optimal for solely the purpose of frequency offset estimation.

SUMMARY OF THE INVENTION

The present invention provides a method for frequency offset estimation in a TD-SCDMA system capable of estimating the frequency fine offset in a simple and efficient manner. The present invention achieves this by determining the SYNC-DL code QPSK modulation, then comparing it to the received phase of the SYNC-DL sequence to get the phase drift. Lastly, the desired frequency offset is derived based on the phase drift.

DETAILED DESCRIPTION OF THE INVENTION

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

The concepts of this invention relate generally to wireless digital communication systems and, in particular, to fast and efficient frequency offset measurement techniques for TD-SCDMA technology.

Figure 1:
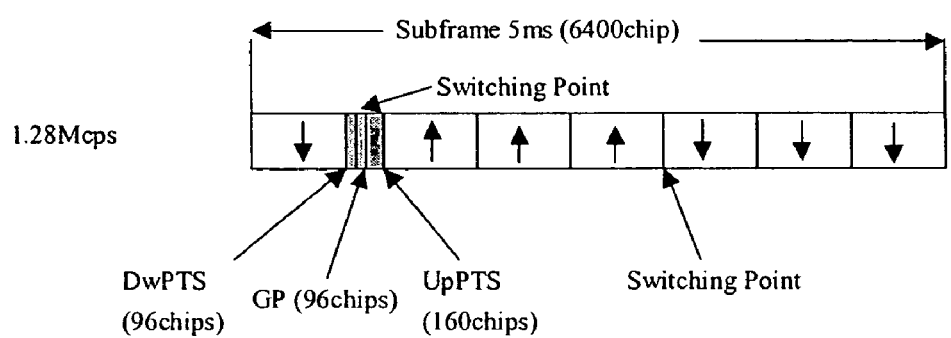
FIG. 1 describes the structure of a sub-frame in a TD-SCDMA system

FIG. 1 illustrates the time frame structure for the 1.28 Mcps low clip rate option of a wireless system as currently specified by 3GPP. Ten (10) ms frames are divided into two sub-frames of five (5) ms each. Each sub-frame includes seven (7) timeslots and a separate area for uplink and downlink synchronization (SYNC) signals. Each timeslot 0-6 is configured to receive communication data symbols and an identifying midamble code. Timeslot 0 is always a downlink (DL) slot. Timeslot 1 is always an uplink (UL) slot. Timeslots 2-6 are configurable for either UL or DL usage.

Between Timeslot 0 and Timeslot 1, there exists a ninety-six (96) chip long Downlink Pilot Timeslot (DwPTS), a ninety-six (96) chip long guard period (GP) and a one-hundred sixty (160) chip long uplink pilot timeslot (UpPTS). Within the DwPTS there is a thirty-two (32) chip long guard period and a 64 chip Synchronous (SYNC-DL) code section. In addition, every two (2) frames (four sub-frames) defines a 20 ms superframe.

In the current 3GPP system specification, there are thirty-two (32) SYNC-DL codes, each having sixty four (64) elements. Each SYNC-DL code points to four basic midamble codes (of length 128) so that there are total of 128 basic midamble codes. In addition, each timeslot's midamble code (of length 144) is generated from a basic midamble code (of length 128).

Figure 2:
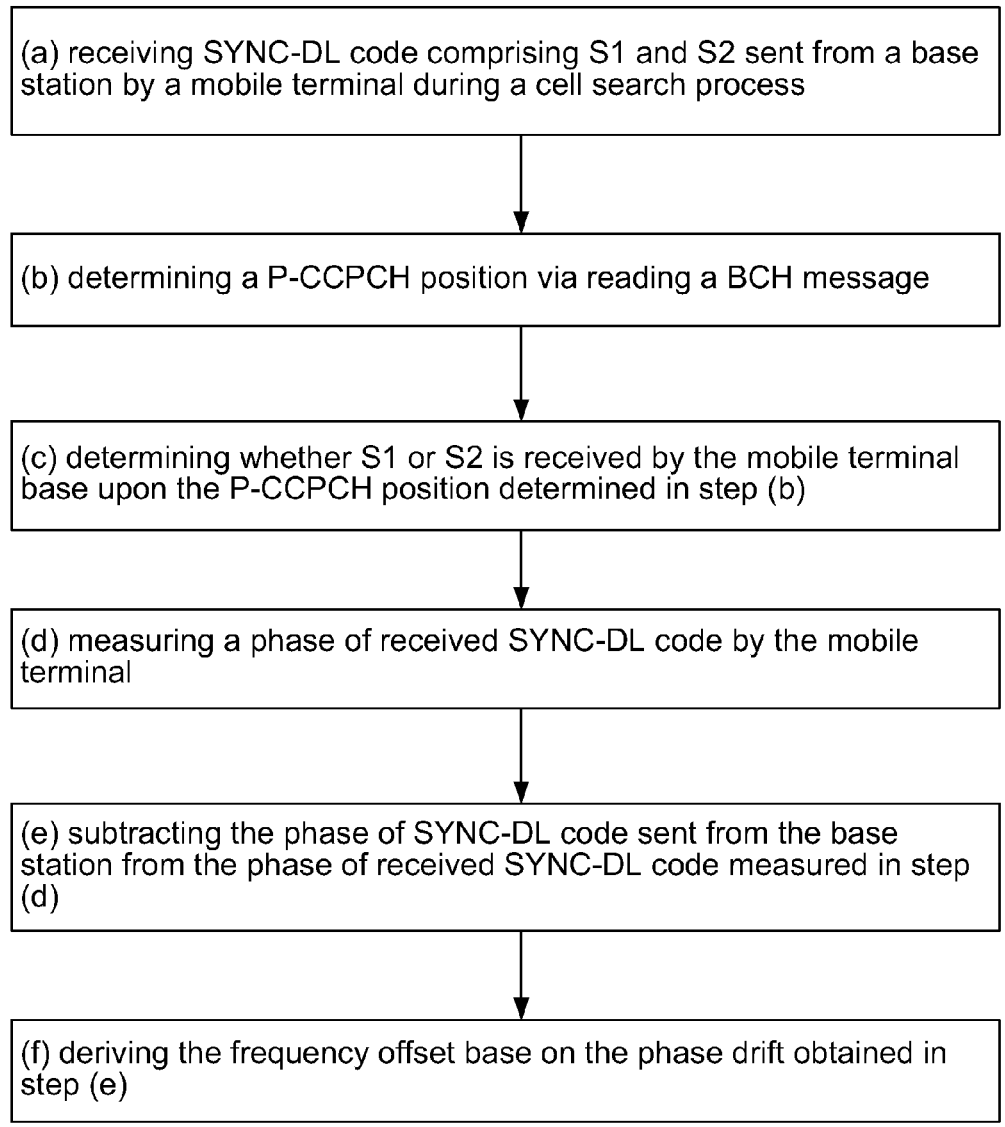
FIG. 2 is a flow chart of a method of obtaining a phase drift from the base station to the mobile terminal according to a preferred embodiment of the present invention.

Referring to FIG. 2 of the drawings, a method of obtaining a phase drift from the base station to the mobile terminal is explained hereinafter.

An objective of synchronization is to be able to receive data of a broadcast channel (BCH) which is carried by a Primary Common Control Physical Channel (P-CCPCH) in Timeslots 0 of a 20 ms superframe (4 subframes). Presently, two different sequences of SYNC-DL code modulation are specified for four sequential DwPTS. A first sequence, S1, indicates that there is a P-CCPCH carrying a BCH in the next four (4) subframes; a second sequence, S2, indicates that there is no such P-CCPCH in the next four (4) subframes. Where sequence S1 of the modulation of the SYNC-DL codes of a superframe is found, the data from the BCH can be read from the P-CCPCH of the next superframe. As QPSK is used for the modulation of the SYNC-DL, the phases 45, 135, 225, and 315 degrees are used.

3GPP TS 25.224 V5.2.0 suggests a four step procedure, basically known as cell search process, for mobile handset determination of synchronization. Upon the completion of the initial cell search, the P-CCPCH is determined and the complete broadcast channel (BCH) information is read by the mobile handset.

The SYNC-DL sequence is about 500 chips away from the Midamble code in Timeslot 0, and the length of 500 chips is long enough to generate noticeable frequency offset for estimating frequency fine offset. The total number of different phase quadruples is 2 (S1 and S2). A quadruple always starts with an even system frame number ((SFN mod 2)=0). The following table shows the quadruples and their meaning:

| Name | Phase quadruple | Meaning |
| --- | --- | --- |
| S1 | 135, 45, 225, 135 | There is a P-CCPCH in the next 4 sub-frames |
| S2 | 315, 225, 315, 45 | There is no P-CCPCH in the next 4 sub-frames |

The received signal's operational phase is actually the combination of QPSK modulation phase and phase drift.

Thus, in accordance with the present method, upon completion of the cell search process and the reading of the BCH message, the P-CCPCH's position is known. Sequence S1 or S2 is therefore determined, where if a P-CCPCH is present in the next superframe, sequence S1 is ascertained, a second sequence S2 is indicated if there is no such P-CCPCH in the next superframe. Thus, the QPSK modulation of SYNC-DL code is obtained in this step. At the next step, the phase of the received SYNC-DL sequence is measured. The QPSK modulation obtained in a first step from the operational phase is then subtracted to obtain the desired phase drift. Finally, the frequency offset is derived using the phase drift with the equation of $\Delta\phi=\Delta f*T$, where $\Delta\phi$ is phase drift, $\Delta f$ represents frequency offset and T denotes sequence duration.

The method described herein for frequency offset estimation of a wireless device provides the advantage of computing and compensate the frequency fine offset in a simple and efficient way.

While particular embodiments of the present invention have been described herein in detail, it is to be understood that various alterations, modifications and substitutions can be made therein without departing in any way from the spirit and scope of the present invention, as defined in the claim which follow. Various modifications and combinations of the illustrative embodiments, as well as other embodiments of the invention, will be apparent to persons skilled in the art upon reference to the description. It is therefore intended that the appended claim encompass any such modifications or embodiments.

What is claimed is:

1. A method for frequency offset fine estimation in a TD-SCDMA system, comprising:
    (a) receiving SYNC-DL (synchronization downlink) code comprising S1 and S2 sent from a base station by a mobile terminal during a cell search process, wherein S1 and S2 are two different QPSK (Quadrature Phase Shift Keying) modulation sequences of the SYNC-DL code;
    (b) determining a P-CCPCH position upon the completion of the initial cell search via reading a BCH message sent from the base station by a mobile terminal;
    (c) determining whether S1 or S2 is received by the mobile terminal base upon the P-CCPCH position determined in step (b), wherein S1 is ascertained to be received if there is no P-CCPCH following thereafter, or S2 ascertained to be received if there is P-CCPCH following thereafter;
    (d) measuring a phase of received SYNC-DL code by the mobile terminal, wherein the SYNC-DL code is S1 or S2, and a phase of SYNC-DL code sent from the base station is known in step (c) by determining whether S1 or S2 is received;
    (e) subtracting the phase of SYNC-DL code sent from the base station from the phase of received SYNC-DL code measured in step (d) to obtain a phase drift from the base station to the mobile terminal; and
    (f) deriving the frequency offset base on the phase drift obtained in step (e).

2. A method for correcting a frequency drift between a mobile terminal and a base station in a TD-SCDMA system, comprising:
    (a) receiving SYNC-DL (synchronization downlink) code comprising S1 and S2 sent from a base station by a mobile terminal during a cell search process, wherein S1 and S2 are two different QPSK (Quadrature Phase Shift Keying) modulation sequences of the SYNC-DL code;
    (b) determining a P-CCPCH position upon the completion of the initial cell search via reading a BCH message sent from the base station by a mobile terminal;
    (c) determining whether S1 or S2 is received by the mobile terminal base upon the P-CCPCH position determined in step (b), wherein S1 is ascertained to be received if there is no P-CCPCH following thereafter, or S2 ascertained to be received if there is P-CCPCH following thereafter;
    (d) measuring a phase of received SYNC-DL code by the mobile terminal, wherein the SYNC-DL code is S1 or S2, and a phase of SYNC-DL code sent from the base station is known in step (c) by determining whether S1 or S2 is received;
    (e) subtracting the phase of SYNC-DL code sent from the base station from the phase of received SYNC-DL code measured in step (d) to obtain a phase drift from the base station to the mobile terminal;
    (f) deriving the frequency offset base on the phase drift obtained in step (e); and
    (g) performing an automatic frequency control (AFC) by a mobile terminal to correct the frequency offset between the mobile terminal and the base station.

* * * * *